United States Patent
Tsumura et al.

(10) Patent No.: US 6,215,537 B1
(45) Date of Patent: Apr. 10, 2001

(54) LIQUID CRYSTAL DISPLAY HAVING BACKSCATTERING POLARIZER

(75) Inventors: Akira Tsumura; Fumio Matsukawa; Kyoichiro Oda; Shuji Iwata, all of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,514

(22) Filed: Apr. 8, 1999

(30) Foreign Application Priority Data

Nov. 12, 1998 (JP) .................................. 10-321919

(51) Int. Cl.[7] .............................................. G02F 1/1335
(52) U.S. Cl. ................................. 349/98; 349/96; 349/64
(58) Field of Search .................... 349/96, 98, 64, 349/115, 9, 95

(56) References Cited

U.S. PATENT DOCUMENTS

| | | | |
|---|---|---|---|
| 4,415,236 | * 11/1983 | Perregaux | 349/112 |
| 5,684,551 | * 11/1997 | Nakamura et al. | 349/99 |
| 5,995,183 | * 11/1999 | Tsuyoshi | 349/112 |
| 5,999,239 | * 12/1999 | Larson | 349/96 |

FOREIGN PATENT DOCUMENTS 8-76114   3/1996   (JP) .

OTHER PUBLICATIONS

Denshi–Gijutsu (Electrotechnology), Hisao Ishii, Jul. 1997, pp. 7–10.
Denshi–Gijutsu (Electrotechnology), Keiichi Nakajima, Jul. 1997, pp. 11–14.
New Materials, Kazumitsu Kawamura, Nov. 1993, pp. 71–75.

* cited by examiner

*Primary Examiner*—Toan Ton
(74) *Attorney, Agent, or Firm*—McDermott, Will & Emery

(57) ABSTRACT

A liquid crystal display includes: a scattering-polarizer provided between a liquid crystal and a back light for transmitting a polarization component in one direction of light from back light, but scattering and reflecting a polarization component in a direction which is orthogonal thereto: and a scattered light reflector reflecting the reflected and scattered light toward scattering-polarizer along with the polarization component in above mentioned one direction. Thus, a liquid crystal display which is inexpensive and has high display quality with reduced power consumption is obtained.

7 Claims, 5 Drawing Sheets

LIQUID CRYSTAL DISPLAY HAVING BACKSCATTERING POLARIZER

BACKGROUND OF THE INVENTION

1. Field of the Invention

The present invention relates to liquid crystal displays, and more particularly to a liquid crystal display of a direct view type.

2. Description of the Background Art

Recently, a liquid crystal display is actively used for a personal OA (Office Automation) instrument such as a word processor, notebook personal computer or desktop personal computer as well as an image display unit such as a television because of its small thickness, lightweight and small power consumption. Particularly, a liquid crystal display of an active matrix type is actively developed as a portable display because it enables a high resolution display in addition to the advantage of small thickness, lightweight and small power consumption. (Hisao Ishii, *Denshi-Gijutsu* (*Electrotechnology*), July 1997, p.7)

A liquid crystal itself does not emit light. It functions as a display by controlling light which is transmitted therethrough. There are generally two ways of directing light through the liquid crystal. One is related to a liquid crystal of a direct view or transmission type in which a back light is provided behind the liquid crystal, and the other is related to a liquid crystal of a reflective type which allows light in the environment surrounding a viewer to be transmitted through the liquid crystal from front, reflected by a reflector plate behind the liquid crystal and again transmitted through the liquid crystal from back.

The liquid crystal display of the direct view type is always provided with the back light of a light source behind the liquid crystal panel. As shown in FIGS. 7A and 7B, there are two types of back lights: edge light type and vertical type. The edge light type shown in FIG. 7B includes: a bar like light 51 (which is either a cold cathode tube or hot cathode tube) at an end of a light conducting plate 54; a reflector plate 53 behind light conducting plate 54; and a scattering or diffusion plate 52 in front of light conducting plate 54 which has a lens sheet (that is, an optical sheet such as a prism sheet and wave sheet) and is provided with a protection function. The vertical type shown in FIG. 7A has a structure having light 51 immediately below diffusion plate 52, and it does not require the light conducting plate used in the edge light type (see for example, Keiichi Nakajima, *Denshi-Gijutsu* (*Electrotechnology*), July 1997, p.11).

The above described liquid crystal display does not have a large volume nor weight unlike a CRT(Cathode-Ray Tube). In addition, it needs not be operated at a high voltage, so that power consumption thereof is small. In other words, the liquid crystal display is characterized by its small thickness, lightweight and small power consumption unlike the CRT. However, transmittance of a polarizer for a liquid crystal panel is about 40% to 45%, and half of the light from the back light which consumes the largest amount of power in the liquid crystal display is not effectively utilized. This is because only polarization component in one direction is transmitted of all light which is directed to the polarizer from the back light, and that in a direction which is orthogonal to the above mentioned direction is absorbed by the polarizer.

To solve this problem, a method of inserting a so called reflecting-polarizer or a highly transmissive polarizer between the liquid crystal panel and the back light has been proposed, and a product manufactured in accordance with the method has been obtained. Such products include DBEF (Double Brightness Enhancement Film) of 3M Corporation and Transmax of Merck & Co., Inc. Such reflecting-polarizer is obtained by forming a multilayer film having an optical function on a polymer film by an evaporation method, or by specifically aligning molecules of a cholesteric liquid crystal for application on a polymer film. As shown in FIG. 8, such reflecting-polarizer allows transmission of only one of two polarization components from the back light (that is, two linearly polarized light which are orthogonal to each other or two circularly polarized light which rotate in opposite directions) and reflects the other. As the reflection is mirror reflection, the reflecting-polarizer looks like a mirror.

The polarized light which has been reflected by the reflecting-polarizer is returned to and reflected by the back light, so that the completely polarized state is partially cancelled. In other words, light having one polarization component is converted to light having two polarization components and again directed to the reflecting-polarizer. Again, one of the polarization components is transmitted through the reflecting-polarizer and the other reflected thereby. The process is repeated. Therefore, a larger amount of light is directed from the back light through the reflecting-polarizer, and therefore light is effectively utilized. As a result, even when brightness of the back light is reduced, high brightness is obtained for the liquid crystal display. In addition, as a back light which consumes a small amount of power can be applied, overall power consumption of the liquid crystal display is reduced.

However, the function of the reflecting-polarizer which allows transmission of only one polarization component and reflection of the other is insufficient. Further, as light is absorbed by various optical components during travel, utilizing efficiency of the light would not be so high as compared with the conventional case.

Besides the above mentioned reflecting-polarizer, referring to FIG. 9, a method of using an anisotropic scatterer which allows transmission of polarization component in one direction and forward scattering of that in a direction which is orthogonal thereto has been proposed (Japanese Patent Laying-Open No. 8-76114). The scattering by the anisotropic scatterer is mainly forward scattering. It is thus different from a scattering-polarizer which is used in the present invention and will later be described. The principle of forward scattering by the anisotropic scatterer is still unclear in many respects.

In a conventional liquid crystal display in which the reflecting-polarizer is held between a back light and a liquid crystal panel, light from the back light is effectively utilized. Thus, brightness of the back light is reduced as compared with the conventional display, whereby power consumption of the liquid crystal display can be reduced. However, disadvantageously, the reflecting-polarizer is expensive as it is manufactured with a complicated manufacturing process and requires high technology for aligning molecules of a liquid crystal. In addition, a material of the reflecting-polarizer may readily allow deformation due to heat and coloring, thereby reducing quality of display. Further, the anisotropic scatterer which allows transmission of light component in one direction and forward scattering of that in the direction orthogonal thereto had a problem which is similar to that of the reflecting-polarizer.

SUMMARY OF THE INVENTION

An object of the present invention is to provide a liquid crystal display which is inexpensive and provides enhanced display quality with reduced power consumption by providing a scattering-polarizer, which is different from the above mentioned reflecting-polarizer or anisotropic scatterer, between a back light and a liquid crystal.

The most basic liquid crystal display according to the present invention is a liquid crystal display which allows display of a liquid crystal portion to be viewed from a front side of a liquid crystal by transmitting light through the liquid crystal from a back light provided behind the liquid crystal. The liquid crystal display includes: a scattering-polarizer provided between the back light and the liquid crystal for transmitting a polarization component of the light in one direction from the back light, but reflecting with scattering a polarization component in a direction which is orthogonal thereto toward a direction which is opposite to the direction of light; and a scattered light reflector reflecting the above mentioned reflected and scattered light toward the scattering-polarizer, including the above mentioned polarization component in one direction.

The above described structure makes it possible to utilize part of the polarization component in the direction which is orthogonal to one direction, which has not conventionally contributed to display, so that utilizing efficiency of the light from the back light is increased. As a result, a liquid crystal display which is inexpensive and provides enhanced display quality with reduced power consumption can be achieved. In addition, coloring or reduction in the display quality is prevented unlike the case where the reflecting-polarizer is used.

In the above described liquid crystal display, desirably, light scattered from the scattering-polarizer is reflected and scattered by the back light and again emitted as scattered light as described below. In other words, the back light includes a fluorescent tube emitting light and a reflector reflecting light and directing the reflected light toward the scattering-polarizer. The reflector desirably functions as the scattered light reflector.

Utilizing efficiency of light from the back light is increased as light of the polarization component orthogonal to one direction which is scattered by the scattering-polarizer is reflected, and the polarized state only in this direction is partially cancelled, so that the light includes the polarization component transmitted through the scattering-polarizer. This increase in the utilizing efficiency makes it possible to ensure high display quality even when brightness of the back light and the power consumption are reduced.

If a lens sheet having a function of a lens is used with the above described structure, brightness is further increased. Desirably, the above described liquid crystal display further includes a lens sheet provided between the scattering-polarizer and the scattered light reflector for refracting and transmitting light which has been reflected with scattering by the scattering-polarizer, and collecting it onto the scattered light reflector.

By employing the lens sheet which refracts the light reflected with scattering by the scattering-polarizer and collects it onto the scattered light reflector, the scattered light can be effectively utilized. As a result, high display quality of the display is ensured even if the brightness of the back light and power consumption are reduced.

By employing a scattering-controlling-film in addition to the above mentioned sheet, utilizing efficiency of the light from the back light is further increased. In this case, it is desirable to have a scattering-controlling-film between the scattering-polarizer and the scattered light reflector for transmitting light which has been reflected with scattering by the scattering-polarizer by changing a scattering degree in accordance with an angle of incidence.

By employing the above mentioned scattering-controlling-film for transmitting the light which has been reflected with scattering by the scattering-polarizer by changing the scattering degree in accordance with the angle of incidence, the light which has not conventionally been utilized is directed into the back light, so that utilizing efficiency of the light is increased.

More specifically, the above mentioned scattering-controlling-film is provided between the scattering-polarizer and the lens sheet for transmitting light which has a relatively small angle of incidence of the light reflected with scattering by the scattering-polarizer as it is and transmitting with scattering light which has a relatively large angle of incidence. Desirably, the lens sheet refracts and transmits the diagonally travelling scattered light from the scattering-controlling-film for collecting it onto the scattered light reflector.

The scattering-controlling-film can increase an amount of light reaching the scattered light reflector. As a result, utilizing efficiency of light from the back light is increased and high display quality can be ensured without use of a diffusion plate having a protection function.

The above described scattering-controlling-film can be inserted between the lens sheet and the scattered light reflector. In this case, the display has a structure having the scattering-controlling-film between the lens sheet and the scattered light reflector for transmitting and scattering light having a relatively small angle of incidence of the light which has been reflected with scattering by the scattered light reflector and transmitted through the lens sheet, and for transmitting light having a relatively large angle of incidence as it is.

More specifically, it is desirable that the transmission through the scattering-polarizer of the polarization component in one direction is desirably performed with a little scattering.

As described above, by transmitting light through the scattering-polarizer while making it slightly extend radially, scattered light which is necessary for display is obtained without use of the scattering or diffusion plate having the protection function of the back light. Thus, an inexpensive liquid crystal display is obtained in which coloring and reduction in display quality are prevented.

Arrangement of an optical component having the above described function enables display with high visibility and quality.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described in detail with reference to the drawings.

First Embodiment

Figure 1:
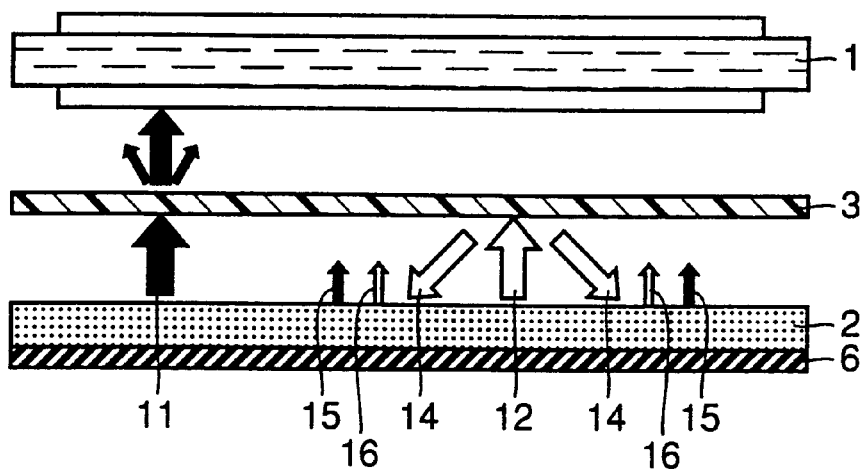
FIG. 1 is a view showing a structure of a liquid crystal display according to a first embodiment of the present invention in which a scattering-polarizer is provided between a liquid crystal and a back light.

Referring to FIG. 1, light emitted from a back light 2 is directed to a scattering-polarizer 3. A polarization component 11 (S-polarization) in one direction of two polarization components which are orthogonal to each other is forwardly transmitted while being slightly scattered by scattering-polarizer 3, and a polarization component 12 (P-polarization) in a direction which is orthogonal to the above mentioned one direction is backwardly scattered by scattering-polarizer 3. The polarized state of one component of polarization component 14 which has been backwardly scattered is partially cancelled while it is reflected inside back light 2, ultimately reflected by a scattered light reflector 6 and emitted from back light 2 including not only P-polarization 16 but also S-polarization 15. Thus, ratio of S-polarization of the light emitted from back light 2 is not negligible. As a result, an amount of light directed to a liquid crystal 1 increases, thereby enabling bright display. In other words, ratio of the light which is effectively utilized of the light emitted from the back light increases.

Figure 7A:
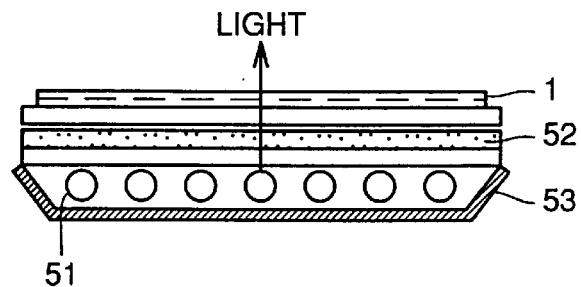
FIGS. 7A and 7B are views showing back lights, where FIGS. 7A and 7B respectively show back lights of vertical and edge light types.
Figure 7B:
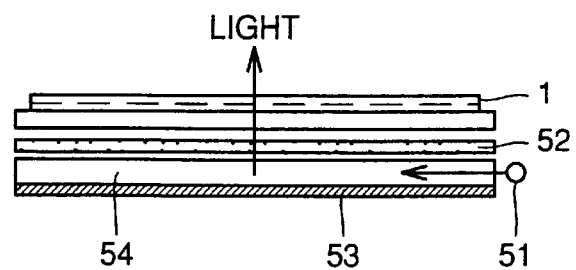
Figure 8:
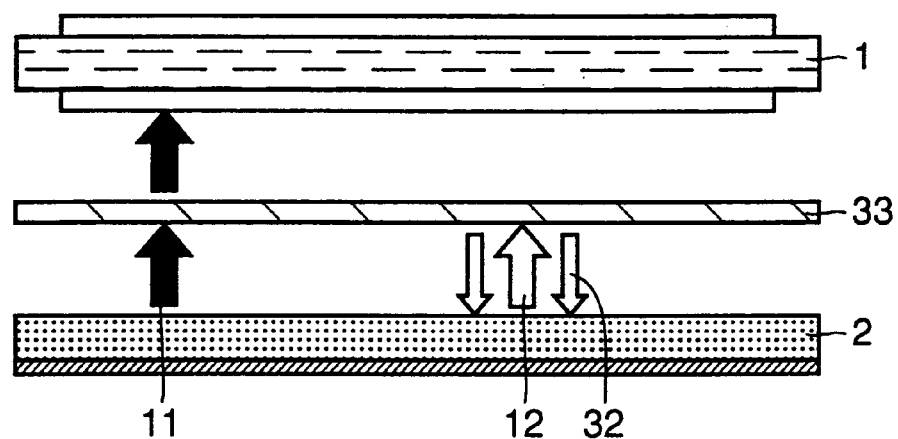
FIG. 8 is a view showing a structure of a conventional liquid crystal display in which a reflecting-polarizer is provided between a liquid crystal panel and a back light.
Figure 9:
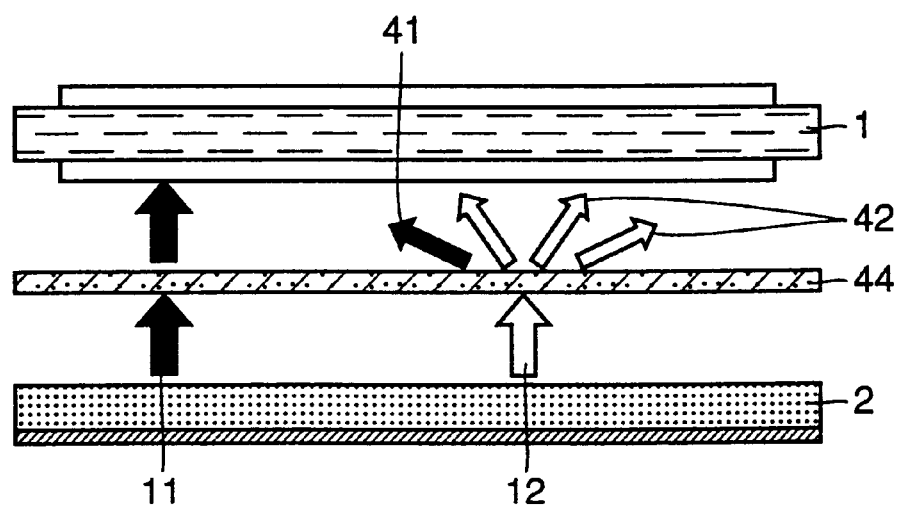
FIG. 9 is a view showing a structure of a conventional liquid crystal display in which an anisotropic scatterer is provided between a liquid crystal panel and a back light.

Scattered light reflector 6 corresponds to a reflector 53 in the back light shown in FIGS. 7A and 7B. However, as scattered light reflector 6 generally refers to a component including a fluorescent tube surface and a surface or a corner of light conducting plate, if it has a reflecting function. Therefore, it is not limited to the reflector.

When the above mentioned structure is used, brightness of the liquid crystal display is about 1.5 times that in the case where scattering-polarizer 3 is not held between back light 2 and liquid crystal panel 1. Even when scattering-polarizer 3 is used, coloring of image which often occurs during use of the reflecting-polarizer and reduction in display quality are prevented. Further, image with high visibility is ensured without use of a scattering or diffusion plate which has a protection function and is generally provided at an outermost portion of back light 2. This is because scattering-polarizer 3 has a function which is similar to that of the scattering or diffusion plate, that is, a function of slightly and forwardly scattering light rather than transmitting it completely in a straight direction.

The above described scattering-polarizer may be anything as long as it scatters and reflects one of two polarization components which are orthogonal to each other in a direction which is opposite to a travelling direction of light rather than directly reflecting it, and forwardly transmits and slightly scatters the other radially. A desirable structure of the scattering-polarizer includes a macromolecule film in which a transparent material having anisotropy as to refractive index, which is different from a binder of a main material, is uniformly scattered. Such scattering-polarizer can readily be manufactured without any complicated step of evaporation or high technology for aligning molecules of a liquid crystal. In addition, as the material therefore is relatively easily acquired, it is inexpensive. Such scattering-polarizer may also be combined with a conventional polarizer to serve as a scattering-polarizer. When a scattering-polarizer having such function is used, a polarizer on the side of a back light of two polarizers generally provided on a liquid crystal panel would be unnecessary. As in the above described embodiment, scattering or diffusion plate 52 having a protection function needs not be provided for the back light as the scattering-polarizer is provided between the back light and the liquid crystal. Thus, the liquid crystal display can be obtained which is inexpensive and has high display quality with reduced power consumption while preventing coloring.

Second Embodiment

Figure 2:
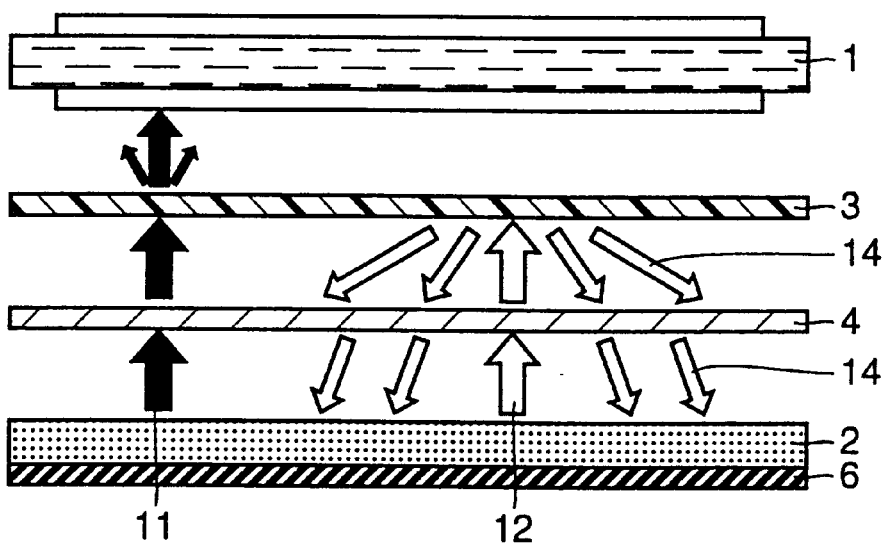
FIG. 2 is a view showing a structure of a liquid crystal display according to a second embodiment of the present invention in which a lens sheet is further added to the structure shown in FIG. 1 (where light which is again directed from the back light is not shown).
Figure 3:
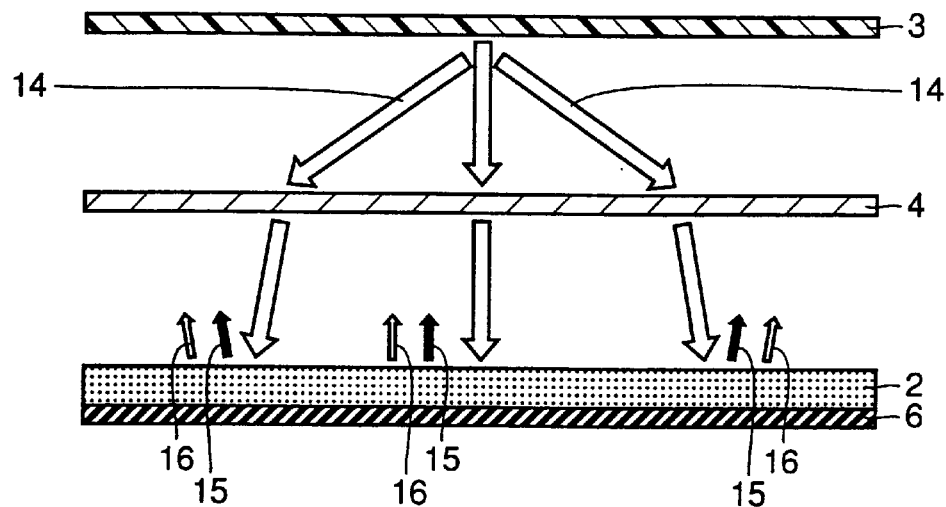
FIG. 3 is a diagram shown in conjunction with P-polarization which is backwardly scattered by a scattering-polarizer, transmitted through the lens sheet, reflected by the scattered light reflector and again emitted from the back light.

Referring to FIG. 2, a liquid crystal display according to the second embodiment of the present invention has a structure in which a lens sheet 4 is provided between a back light 2 and a scattering-polarizer 3 (light which is again emitted from the back light is not shown). In this case, light 14 scattered by scattering-polarizer 3 is transmitted through lens sheet 4, directed to and reflected by back light 2, reflected by a scattered light reflector 6 and again emitted including S-polarization 16 and P-polarization 15, as shown in FIG. 3. As a result, the use of the above mentioned scattering-polarizer 3 and lens sheet 4 has increased front brightness to 1.6 times that in the case where they are not used. In addition, light distribution, that is, an amount of light in accordance with directions of light emitted from the back light, can now be controlled. In this second embodiment, a prism sheet (BEF: Brightness Enhancement Film, manufactured by 3M Corporation) is used. However, this is not limited to the use of a particular prism sheet, and a wave sheet providing similar performance may be used.

The scattering-polarizer generally performs backward scattering and cannot control light distribution of the back light by itself. However, use of the above mentioned lens sheet or wave sheet for refraction has allowed the light distribution to be controlled. It is noted that the light distribution can be controlled even if the lens sheet is provided closer to the liquid crystal than the scattering-polarizer, that is, between the liquid crystal and the scattering-polarizer. This arrangement, however, only allowed increase in front brightness of 1.1 times, and this is not very desirable.

The structure of scattering-polarizer 3 and lens sheet 4 shown in FIG. 2 makes it possible to eliminate scattering (diffusion) plate 52 having the protection function of back light 2 and to control the light distribution of the back light.

Thus, a liquid crystal display which is inexpensive and has high display quality with reduced power consumption while preventing coloring is provided.

Third Embodiment

Figure 4:
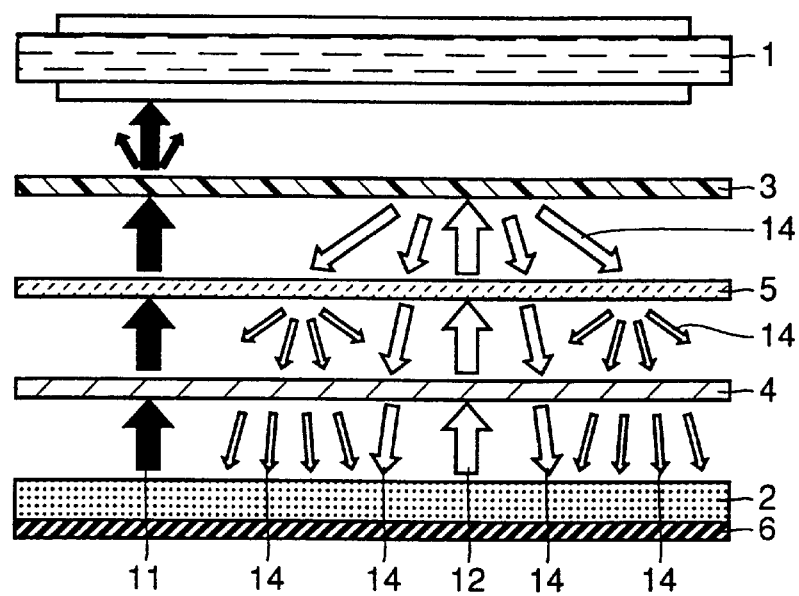
FIG. 4 is a view showing a structure of a liquid crystal display according to a third embodiment of the present invention in which a scattering-polarizer, scattering-controlling-film and lens sheet are provided between a liquid crystal and a back light.
Figure 5A:
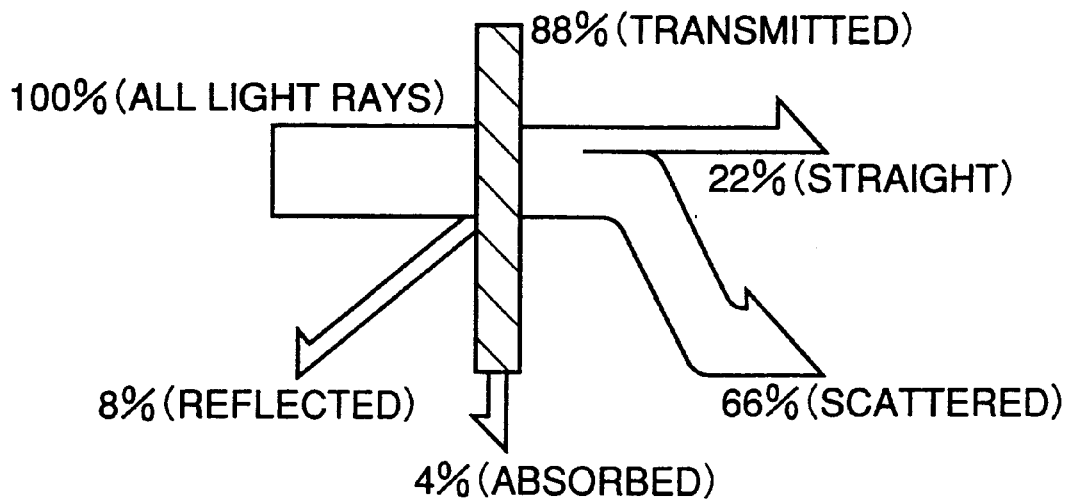
FIGS. 5A and 5B are diagrams showing representative transmission patterns of the scattering-controlling-films, where FIGS. 5A and 5B respectively show the scattering-controlling-films having non-transparent and transparent front surfaces.
Figure 5B:
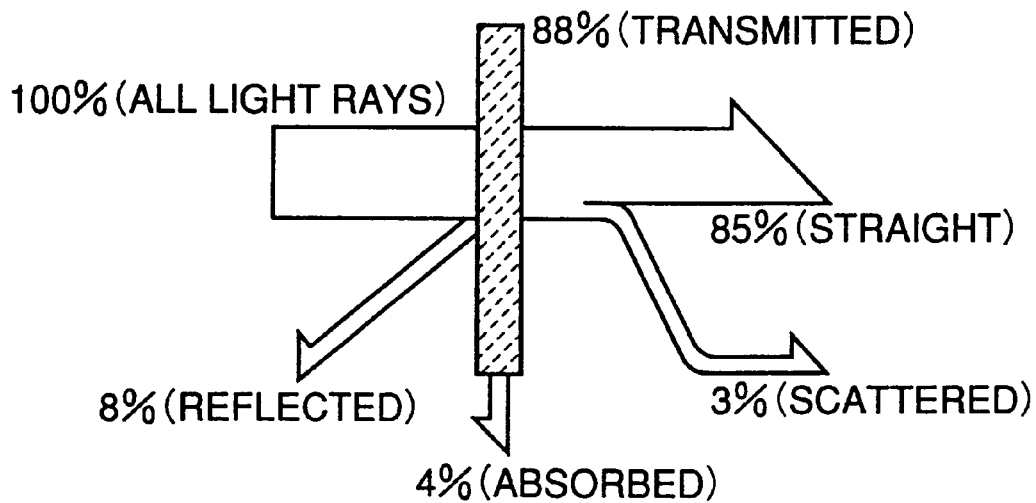

Referring to FIG. 4, a liquid crystal display according to a third embodiment of the present invention has a structure in which a lens sheet 4 and a scattering-controlling-film 5 are provided between back light 2 and liquid crystal 1 in addition to scattering-polarizer 3. In this case, scattering-polarizer 3 is provided in a position which is the closest to the liquid crystal, scattering-controlling-film 5 between scattering-polarizer 3 and lens sheet 4, and lens sheet 4 in a position which is the closest to the back light. FIGS. 5A and 5B show representative patterns of transmission of light-ray of scattering-controlling-film 5. FIG. 5A shows a scattering-controlling-film having a non-transparent front and allows significant scattering when light is directed to the front, that is, when an angle of incidence is small. FIG. 5B shows a scattering-controlling-film having a transparent front and allows significant scattering when light is directed to a periphery, that is, when an angle of incidence is large.

Figure 6:
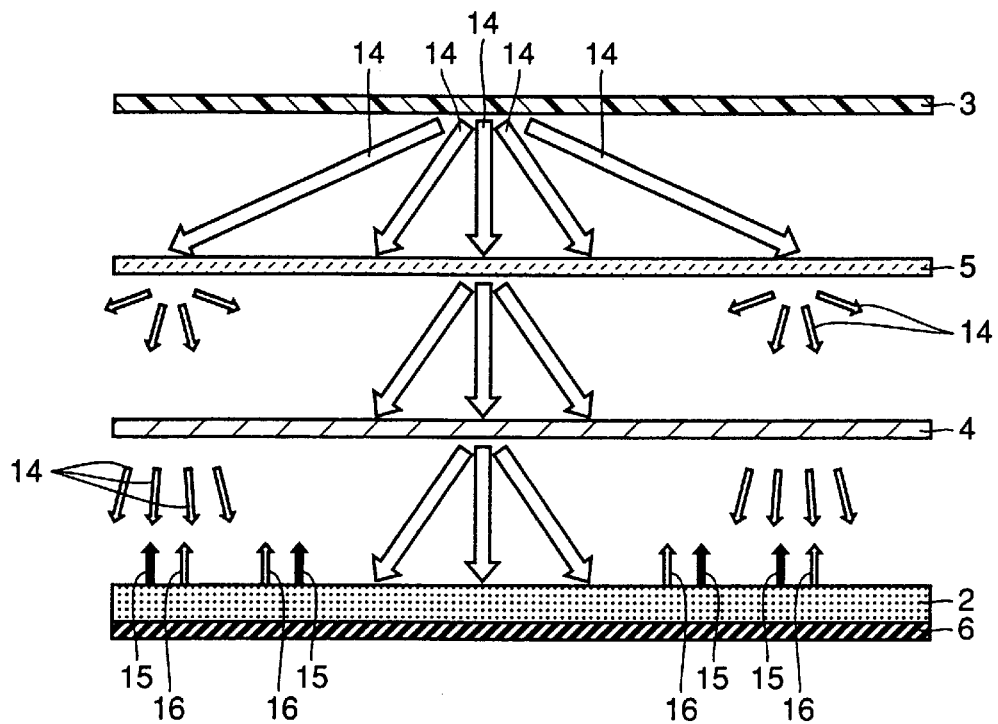
FIG. 6 is a diagram shown in conjunction with P-polarization backwardly scattered by the scattering-polarizer, transmitted through the scattering-controlling-film and lens sheet to the back light and again emitted in the third embodiment of the present invention.

As shown in FIG. 6, P-polarization 14 which is backwardly scattered by scattering-polarizer 3 is transmitted through scattering-controlling-film 5 and lens sheet 4, reflected by a scattering reflector 6 and again emitted from back light 2.

By arranging scattering-polarizer 3, lens sheet 4 and scattering-controlling-film in this way, front brightness is increased to 1.8 times that in the case where these components are not arranged, and light distribution of the back light can be controlled. In the third embodiment, a prism sheet (BEF: Brightness Enhancement Film, manufactured by 3M Corporation) is used as the lens sheet. As in the second embodiment, the lens sheet is not particularly limited to the prism sheet, and anything which has similar performance may be used.

Scattering-controlling-film 5 having a function described in connection with FIGS. 5A and 5B need only to have an optical characteristic of again scattering light having a specific angle of emission of light which has been backwardly scattered from scattering-polarizer 3, and is not limited to a particular component. In the present embodiment, a field control film (Lumisty: MFZ-2555) of Sumitomo Chemical Co., LTD. is used as the scattering-controlling-film (Kazumitsu Kawamura, *New Materials*, November, 1993, p.71). Use of such scattering-controlling-film 5 increases front brightness as an amount of light which returns to lens sheet 4 of light which is emitted from back light 2 and backwardly scattered by scattering-polarizer 3 can be increased. Further, provision of only scattering-polarizer 3 did not enable control of light distribution characteristic of the back light, that is, control of the amount of light in accordance with directions of light emission from the back light. However, lens sheet 4 (a prism sheet or wave sheet) and a scattering-controlling-film or field control film such as Lumisty enables control of the light distribution characteristic.

In the above described example, the scattering-controlling-film (in the case of FIG. 5B) having the transparent front and the periphery which allows scattering is used. When a film which scatters only light directed to the front and transmits the diagonally directed light without scattering (in the case of FIG. 5A: for example, the field control film Lumisty MFX-1515, manufactured by Sumitomo chemical, Co., LTD.) is used, the scattering-controlling-film can be arranged in a position which is the closest to the back light.

In this case, the scattering-polarizer can be arranged in a position which is the closest to the liquid crystal, and the prism sheet is desirably used as lens sheet 4. Then, the front brightness can be increased to about 1.1 times that in the conventional case where scattering-polarizer 3 or the like is not used. However, control of light distribution of back light 2 is difficult. The above described structure eliminates the need for a scattering (diffusion) plate having a protection function of back light 2 as scattering-polarizer 3, lens sheet 4 and scattering-controlling-film 5 are held between back light 2 and the liquid crystal.

Thus, the need for the scattering plate is eliminated and the light distribution characteristic of back light 2 is controlled. As a result, a liquid crystal display which is inexpensive and has high display quality with reduced power consumption while preventing coloring is provided.

Fourth Embodiment

In the above described third embodiment, the liquid crystal display is manufactured by adhering scattering-controlling-film 5 to scattering-polarizer 3. As a result, the front brightness has been increased to 1.8 times that in the case without such structure, and light distribution of the back light can be controlled. In addition, it has been proved that degradation of display quality does not readily occur. Further, the use of such optical components which are adhered together facilitates assembly of the liquid crystal display.

Fifth Embodiment

In the above described third embodiment, the liquid crystal display has been manufactured by adhering scattering-controlling-film 5 to lens sheet 4. As a result, the front brightness has been increased to about 1.1 times that in the case without such structure, and light distribution of back light 2 can be controlled. Further, it has been proved that degradation of display quality does not readily occur. Moreover, the assembly of the liquid crystal display is facilitated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display allowing display of a liquid crystal from a front of said liquid crystal by transmitting light emitted from a back light provided behind said liquid crystal through said liquid crystal, comprising:

a scattering-polarizer provided between said back light and said liquid crystal for transmitting a polarization component in one direction of light from said back light and reflecting with scattering a polarization component in a direction orthogonal to said one direction in a direction which is opposite to a travelling direction of light; and a scattered light reflector reflecting said reflected and scattered light toward said scattering-polarizer including said polarization component in said one direction;

the side of said liquid crystal facing said scattering-polarizer being exposed to said scattering-polarizer such that light passing from said scattering-polarizer to said liquid crystal and polarized by said scattering-polarizer is not subject to further polarization prior to reaching the liquid crystal.

2. The liquid crystal display according to claim 1, wherein said back light includes a fluorescent tube emitting light and a reflector reflecting light and directing the reflected light toward said scattering-polarizer, and said reflector functions as said scattered light reflector.

3. The liquid crystal display according to claim 1, further comprising a lens sheet provided between said scattering-polarizer and said scattered light reflector for refracting and transmitting said light transmitted with scattering from said scattering-polarizer and collecting it onto said scattered light reflector.

4. The liquid crystal display according to claim 3, further comprising a scattering-controlling-film provided between said scattering-polarizer and said lens sheet for transmitting light having a relatively small angle of incidence of light reflected with scattering from said scattering-polarizer as it is and transmitting with scattering diagonally directed light having a relatively large angle of incidence, said lens sheet refracting and transmitting said transmitted and scattered light diagonally directed from said scattering-controlling-film and collecting it onto said scattered light reflector.

5. The liquid crystal display according to claim 3, further comprising a scattering-controlling-film provided between said lens sheet and said scattered light reflector for transmitting with scattering light having a relatively small angle of incidence of light reflected with scattering by said scattering-polarizer and transmitted through said lens sheet, and for transmitting diagonally directed light having a relatively large angle of incidence as it is.

6. The liquid crystal display according to claim 1, further comprising a scattering-controlling-film provided between said scattering-polarizer and said scattered light reflector for transmitting light reflected with scattering by said scattering-polarizer while changing an angle of scattering in accordance with an angle of incidence.

7. The liquid crystal display according to claim 1, wherein said transmission of polarization component in said one direction through said scattering-polarizer is performed with a small amount of scattering.

* * * * *